May 2, 1961     A. A. GRIFFITH     2,982,495
AIRCRAFT WITH TILTABLE LIFT ENGINES
Filed July 21, 1952     4 Sheets-Sheet 1

Inventor
Alan Arnold Griffith

By Wilkinson Mawhinney
Attorneys

May 2, 1961 A. A. GRIFFITH 2,982,495
AIRCRAFT WITH TILTABLE LIFT ENGINES
Filed July 21, 1952 4 Sheets-Sheet 4

Inventor
Alan Arnold Griffith
By Hillman & Mawhinney
Attorneys.

United States Patent Office 2,982,495
Patented May 2, 1961

2,982,495

AIRCRAFT WITH TILTABLE LIFT ENGINES

Alan Arnold Griffith, Derby, England, assignor to Rolls-Royce Limited, Derby, England, a British company Filed July 21, 1952, Ser. No. 300,067

Claims priority, application Great Britain Aug. 16, 1951

11 Claims. (Cl. 244—12)

This invention relates to aircraft and aircraft engine installations.

According to the present invention, an aircraft comprises an aircraft wing structure, a plurality of gas turbine reaction propulsion "slave" units spaced spanwise of the aircraft wing structure, auxiliary equipment including one or more fuel pumps connected to supply fuel to the "slave" units, at least one "master" combustion engine unit arranged to drive said auxiliary equipment, and means to control said master unit independently of said "slave" units. The master unit may be a small gas turbine engine and may either be used solely for driving the auxiliary equipment, or be arranged also to provide power for propulsion of the aircraft. The slave units may be controlled independently or they may be controlled as a single unit by a common control.

According to a feature of the present invention, an aircraft comprises an aircraft wing structure, a plurality of gas turbine reaction propulsion "slave" units spaced spanwise of the aircraft wing structure, one or more of said slave units being mounted in the wing structure to be adjustable to a position in which the thrust line of the unit or units is directed substantially downwards to provide a lifting force on the aircraft, auxiliary equipment including one or more fuel pumps for supplying fuel to the slave units, at least one "master" combustion engine unit driving the auxiliary equipment, and means to control said master unit independently of said slave units. Instead of being adjustable to a position in which the thrust line is directed downwards, one or more slave units may be fixed in the wing structure to have downwardly directed thrust lines. With this arrangement the thrust of slave units can be used for facilitating take-off and landing of the aircraft. Where the unit or units are rigidly mounted to provide vertical thrust such unit or units will normally be used only during take-off and landing.

The adoption of the invention enables a number of small slave reaction propulsion units to be used in place of one large propulsion unit, which is advantageous from the point of view of installations within the thickness of a wing or the chord of a wing flap, and may enable considerable fuel economy to be effected in cruising. For instance, in low speed flight some only of the slave units may be operative, or when the master unit is itself an aircraft propulsion engine, the master unit alone may be operating. In high speed flight all the slave units will normally be operating. Such cruising economy and the power potential for very high speed flight are of importance for fighter and naval aircraft where standing patrols are required.

Neglecting aerodynamic and combustion scale effects, the thrust of geometrically similar gas turbine reaction propulsion engines varies as the square of the linear dimensions whilst the weight varies as the cube. It follows therefore that the specific weight i.e. weight per unit thrust varies approximately as the square root of the thrust. It is therefore advantageous from the point of view of weight of installation to use a multiplicity of small engines rather than a lesser number of larger units.

According to a further feature of the invention, the master unit may be a gas turbine engine of the type commonly known as a "by-pass" engine, that is a gas turbine engine in which part of the air compressed by a low-pressure section of a compressor system is fed to a high-pressure compressor section and part is by-passed past the high-pressure section and also past combustion equipment and a turbine system receiving air compressed in the high-pressure section, and in which the by-passed air flows to atmosphere either through a propelling nozzle which is separate from the main propelling nozzle for the exhaust gases from the turbine system, or through the main propelling nozzle after being mixed with the turbine exhaust gases. When a by-pass engine is used as a master unit, the slave units may be of the simple gas turbine reaction propulsion type in which the whole of the air compressed by the compressor system is delivered to the combustion equipment and then passes through the turbine system before being delivered to atmosphere through a propelling nozzle. Such a combination of a by-pass engine master unit and simple reaction propulsion slave units has the advantages of low fuel consumption under cruising conditions since the by-pass engine is particularly suitable for economical flight at low-speed, and of high maximum thrust with low specific weight.

The master unit may drive in addition to one or more fuel pumps, auxiliaries such as lubricating pumps, electrical generators for the aircraft, hydraulic pumps for the aircraft, and aircraft cabin compressors.

Preferably the slave units are mounted side by side in close proximity to one another, and where they are installed within the thickness of the wing structure of the aircraft or in the trailing edge portion of the wing, a common air inlet duct may be provided extending to the leading edge of the wing.

Preferably the size of the slave units, which may conveniently be of substantially identical construction, is so chosen that their length is considerably less than the chordal dimension of the wing structure.

According to yet a further feature of the invention, a plurality of the slave units are mounted on a common mounting structure which is angularly movable with respect to the main wing structure to vary the angle of the thrust lines of the units in a "vertical" plane with respect to the aircraft. This feature of the invention enables the aircraft to be controlled as to its forward speed and may permit of ascent and descent at substantially zero aircraft forward speed, for example, when the weight of the aircraft is less than the total propulsive thrust available from the slave units and additionally, if provided, from rocket propulsion units.

The use of a plurality of slave units adjustably mounted in accordance with the above feature of the invention permits the positions of the engines to be adjusted in a simple manner thus avoiding arrangements such as have been proposed hitherto in which the propulsive gas stream has been angularly diverted to vary the direction of the thrust line.

Lateral control of the aircraft when it is supported by the jet thrust may be provided by differential adjustment of the fuel supplies to port and starboard banks of slave engines.

Longitudinal control may be provided by having the propelling nozzle of the master engine at the rear of the fuselage and deflecting its thrust in a vertical plane by means of an angularly adjustable nozzle or the like.

Alternatively, one or more additional slave units may be rigidly or angularly adjustably mounted in the tail unit of the aircraft and arranged to provide a variable vertical force by angular adjustment of the thrust line or fuel adjustment or both.

When the aircraft is jet supported, the said controls may be operated manually by interconnection with the normal flying controls; alternatively they may be linked to a gyro stabilizing system or the like.

Each slave unit may comprise if desired a top-speed fuel governor device, e.g. a governor of the centrifugal kind, to avoid the possibility of overspeeding of the unit.

In accordance with a further feature of the invention interconnector ducting is provided between combustion equipment of adjacent slave units, whereby the need to provide a separate ignition system for each unit may be avoided. In order to decrease the possibility of failure of the fuel to ignite, it may be desirable to provide a plurality of electrical or other suitable ignition devices, for example, one electrical igniter may be provided in the slave unit at one end of a bank of slave units and a further electrical ignition device in the slave unit at the other end of the bank.

The exhaust ducts of a plurality of slave units may lead into a common exhaust duct which would generally be of flattened form extending along the trailing edge of the wing structure. Such an arrangement may be suitable where a plurality of slave units are controlled as a single engine. For simplicity of design and production, however, it is preferred that the slave units, apart from any common auxiliary equipment, are formed each as a separate reaction propulsion engine capable of delivering thrust independently of the remainder.

One construction of aircraft embodying an arrangement of the invention will now be described by way of example, the description referring to the accompanying drawings, in which.

Figure 1:
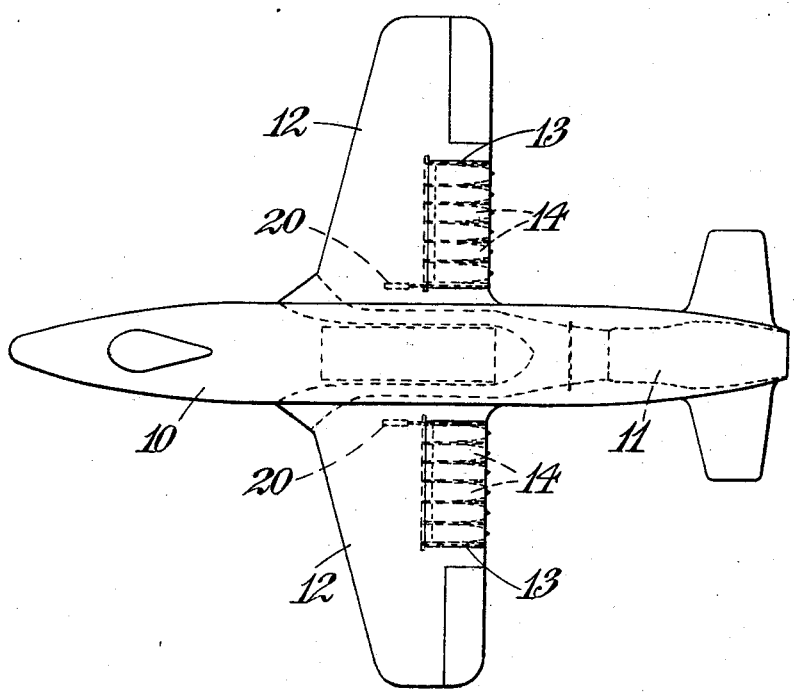
Figure 1 is a diagrammatic plan of the aircraft.

The aircraft illustrated is suitable for naval purposes for operation from an aircraft carrier and comprises a fuselage 10, and an engine 11 of the by-pass kind installed in the fuselage 10 adjacent the tail thereof. This engine 11 is such as to develop a thrust suitable for propelling the aircraft at a low cruising speed, and the engine 11 also drives a number of engine and aircraft auxiliaries as will be described below.

The by-pass engine 11 may be of any convenient construction and is illustrated as comprising a low-pressure axial-flow compressor 11a, a high-pressure axial-flow compressor 11b which receives part of the air compressed in the compressor 11a, the remainder of the air flowing into by-pass duct 11c, combustion equipment 11d receiving compressed air from the compressor 11b, and a multi-stage turbine 11e driving two nested shafts 11f and 11g respectively for driving the compressors 11a, 11b. The exhaust gases from the turbine 11e pass to a propelling nozzle 11h to produce propulsive thrust. The by-pass duct 11c encloses the compressor 11b, combustion equipment 11d and turbine 11e, and extends to an auxiliary propulsion nozzle 11j encircling the nozzle 11h and thus the by-pass air flowing in by-pass duct 11c forms an auxiliary cool jet encircling the hot gas jet from the nozzle 11h.

The combustion equipment 11d is fed with fuel from a manifold 22 to which fuel is delivered from a tank 23 through pipe 24 in which is located a fuel pump 25, a low-pressure shut-off cock 28; the pump 25 is driven from the engine 11.

The aircraft is a monoplane and the inboard portion of each aircraft wing 12 is fitted with a hinged trailing-edge flap 13. The hinge axis of the flaps lies transversely of the aircraft and each flap 13 provides a mounting structure for a bank of slave units 14. For example, as shown in Figure 1, a bank of six units may be mounted in each flap 13.

Figure 4:
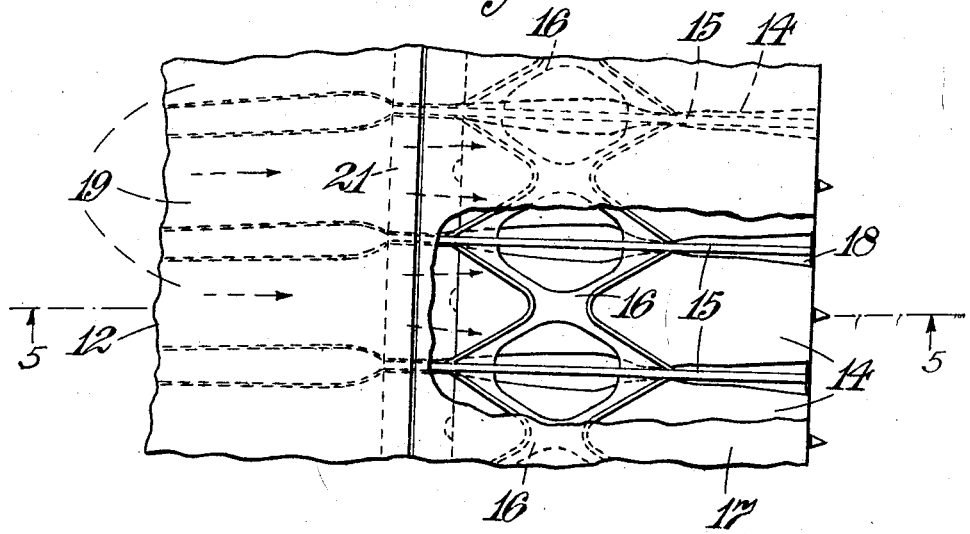
Figure 4 is part of Figure 2 to a larger scale with parts broken away.
Figure 5:
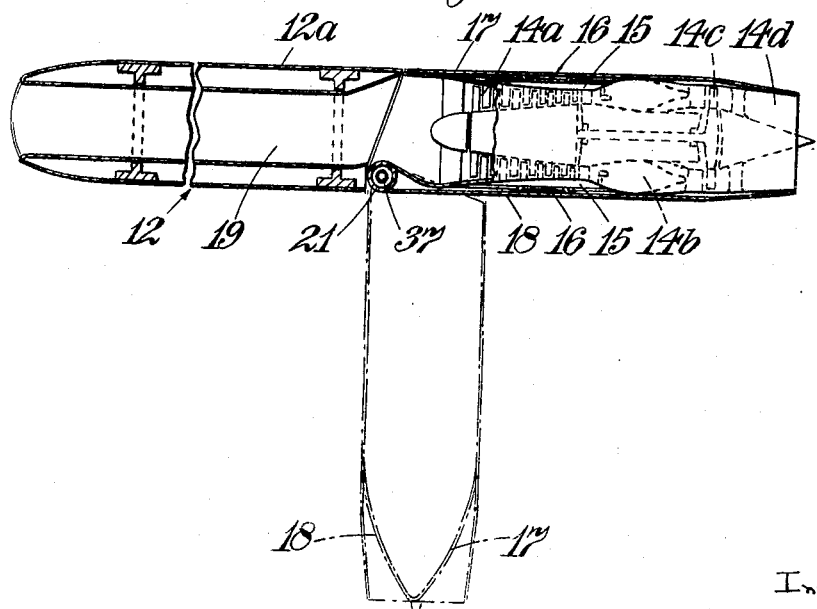
Figure 5 is a section on the line 5—5 of Figure 4.

Each flap 13 may be formed as a girder-like structure (Figures 4 and 5) with a row of spaced mounting beams 15 each lying parallel to the fore and aft axis of the aircraft and braced together in the transverse direction by cruciform members 16. A slave unit 14 is mounted between each pair of beams 15.

Each slave unit 14 (Figure 5) comprises a gas turbine engine having an axial-flow compressor 14a delivering air to annular or tubular combustion equipment 14b from which the products of combustion pass to an axial-flow turbine system 14c; thence the exhaust gases pass to atmosphere through a propelling nozzle 14d.

Figure 3:
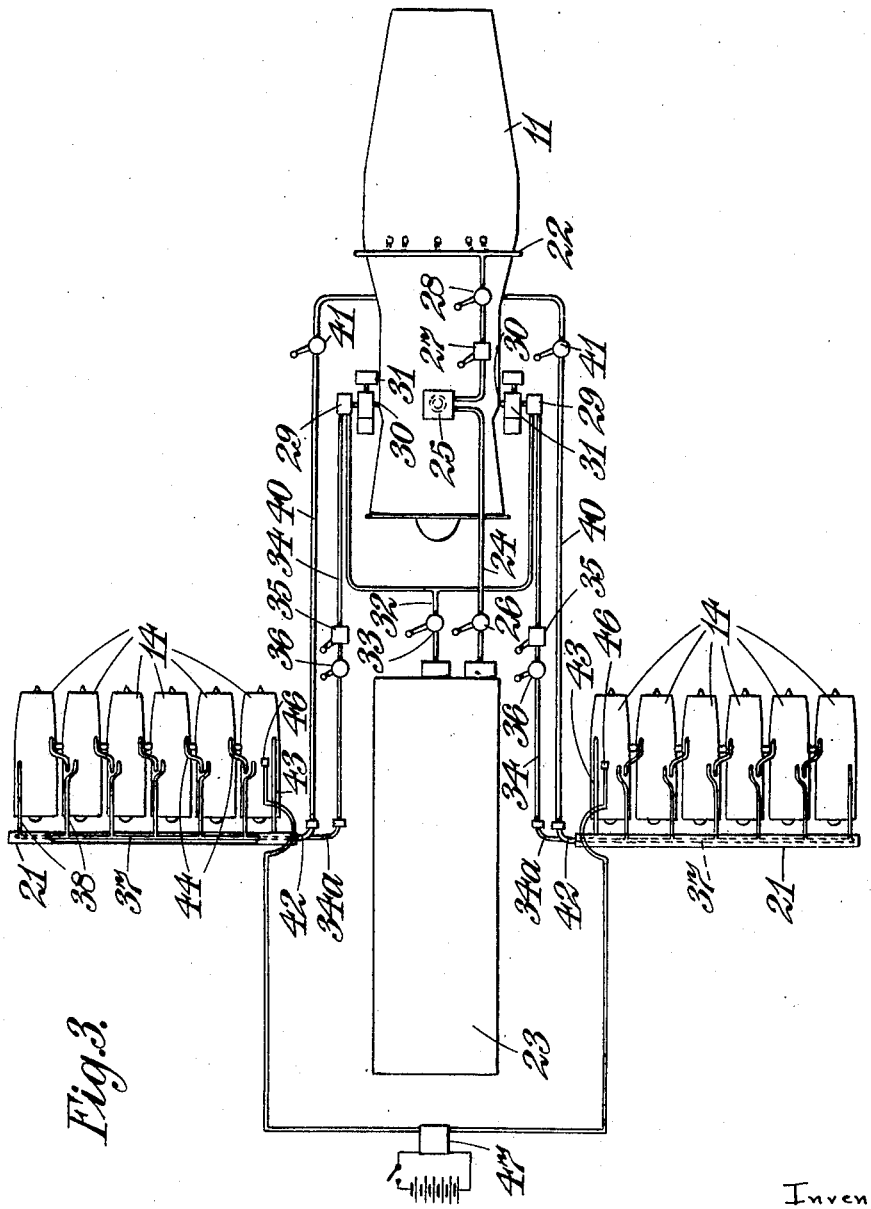
Figure 3 is a diagram illustrating details of the fuel system of the aircraft propulsion unit.

The slave engines of each bank are supplied with fuel by fuel pumps 29 driven by the by-pass engine through drives 30 from shaft 11g; the drives 30 may also, as shown, be employed for driving other auxiliary equipment indicated at 31 (Figure 3) such as lubricant pumps, electrical generators, pumps for supplying pressure fluid to hydraulic equipment of the aircraft, and compressors for cabin pressurisation.

The flap structure has upper and lower sheet metal surfaces 17, 18 respectively which are suitably contoured adjacent the trailing edges of the flange 13 to conform with the exhaust ducts and propelling nozzles of the gas turbine slave units 14. Between the nozzles 14d, the upper and lower surfaces 17, 18 of the flaps are joined together to form the trailing edge of conventional aerofoil form.

The hinge axis of each flap 13 lies adjacent the lower surface 18 at its forward end and the forward edge of the upper surface 17 is arranged so that when the flap 13 is in its normal flight position, it mates in contour with the upper surface 12a of the wing structure 12 supporting the flap.

Figure 2:
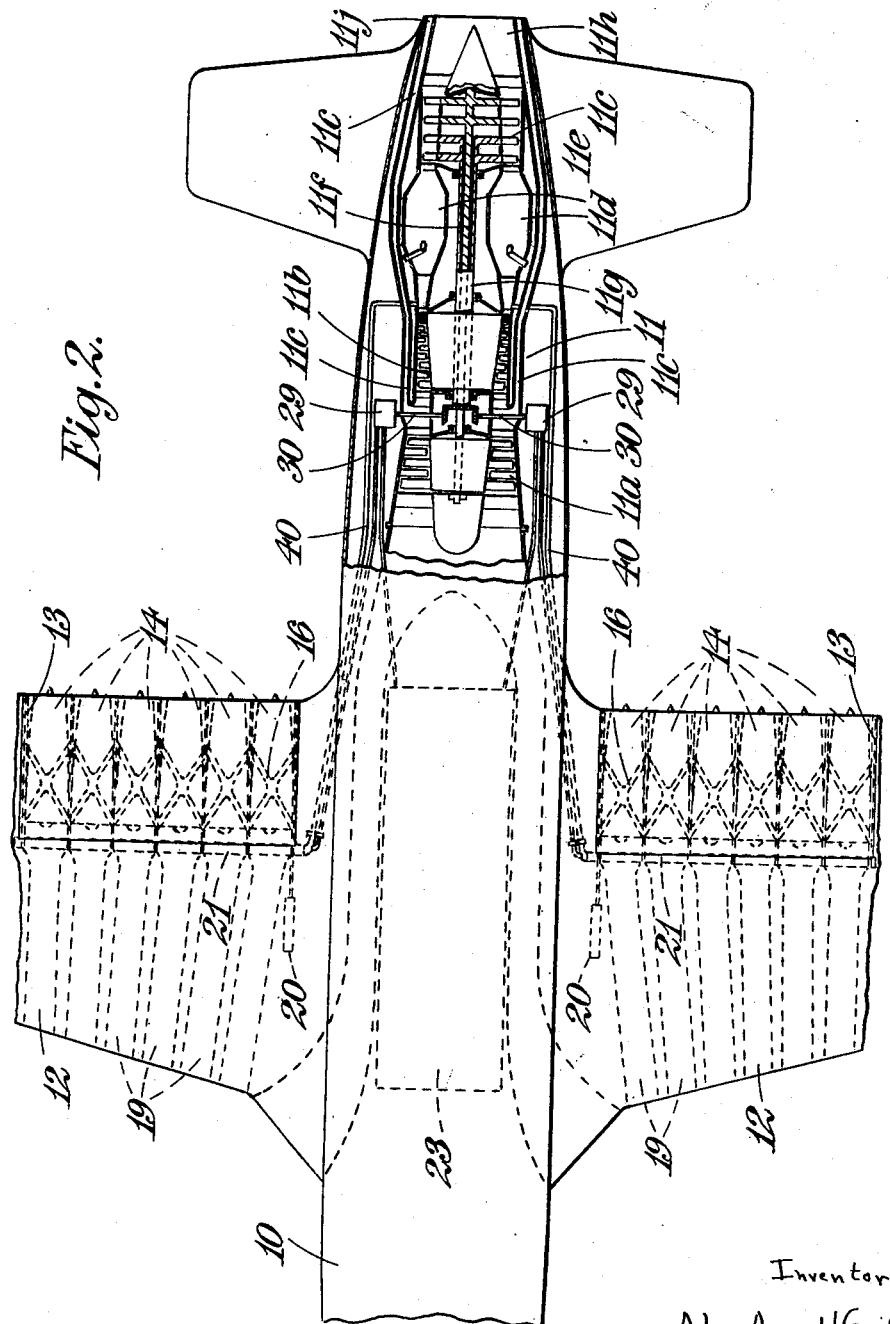
Figure 2 is part of Figure 1 to a larger scale and with parts broken away.

The wing 12 forward of the flap 13 is arranged to provide a number of air passages 19 (Figures 2, 4, 5) which extend from the leading edge of the wing 12 to communicate with the leading portion of the flap 13. Thus air is ducted from the leading edge of the wing 12 into the flap 13 and passes into the annular intakes of the axial flow compressors 14a of the slave unit 14. When the flap 13 is lowered (chain lines Figure 5) a gap appears between the upper surface 12a of the wing 12, and the upper structure 17 of the flap 13 through which air is drawn into the axial-flow compressors 14a of the slave units 14. It will be appreciated that when the flap 13 is lowered the thrust lines of the slave units 14 are directed downwards with respect to the longitudinal axis of the aircraft thereby providing a direct lifting force on the aircraft, assisting in the control of the vertical ascent and descent. The flaps 13 may be adjustable through an angle of approximately 90°, whereby a major lifting force can be applied to the aircraft in addition to the aerodynamic drag arising from lowering of the flaps 13.

Suitable actuating mechanisms, such as hydraulic rams 20, are provided to effect simultaneous lowering of the flaps 13 for ascent and descent.

Conveniently each flap is mounted on a rotatable tube 21 to rock about the tube axis and fuel and air supplies for the slave units 14 are made through the hinge tube.

The fuel supplies are drawn from a tank, such as tank 23, through a pipe line 32 in which is a shut-off cock 33, and are delivered by the pumps 29 through pipe lines 34, in each of which are fitted a throttle 35 and a high pressure shut-off cock 36, to flexible connections 34a. Each flexible connection 34a leads to a distributor pipe 37 accommodated in the hinge tube 21 and branches 38 lead from the pipe 37 to the fuel manifold of each slave unit 14.

In addition, the hinge tube 21 serves for the supply of air tapped-off from the master engine 11 for the purpose of starting the slave units 14. This air may be directed on to the turbine rotor blading of the inboard slave units, causing the rotation of their rotor assemblies.

The air supply is shown by way of example as being tapped-off from the delivery of the compressor 11b of the engine 11 and delivered by conduit 40 containing control valve 41 to a flexible connection 42 leading to the hinge tube 21 from which the air is fed by pipe 43 to the inboard slave unit 14. When the inboard slave unit has started air is tapped from its compressor 14a and delivered to the next adjacent slave unit through an interconnector duct 44. Similar interconnector ducts 44 are provided for supplying starting air to the other slave units each from the compressor of the slave unit next inboard to it.

In addition, the inboard slave units are provided with electrical igniter devices 46 fed from a common electrical source 47 and the remaining slave units have their combustion equipment 14b connected for ignition purposes to the combustion equipment 14b of the next adjacent engines. Other ignition arrangements may be used however.

With an engine installation as just described the pilot's control comprises the throttle 27 for the master engine 11 and independently therefrom two throttles 35 for the slave units 14, one associated with each bank of slave units. In the arrangement described the slave units 14 of each bank are controlled in unison, but the control arrangements may be adopted, whereby for example the slave units of a bank are controlled independently.

In order to avoid the possibility of major damage occurring should one slave engine of a bank fail, each slave unit may have associated therewith an overspeed or excess temperature cut-out. Thus if any slave unit exceeds a maximum rotational speed or the turbine exhaust temperature becomes excessive, this engine will be cut-out or its running speed or temperature reduced. Preferably some form of indicator system is provided for the pilot which may simply take the form of a light indicator showing that the slave unit is operative or inoperative as the case may be.

I claim:

1. An aircraft having an aerodynamically faired structure and comprising a main gas-turbine jet-propulsion engine mounted in said aircraft and having a propelling nozzle through which the jet gases exhaust to atmosphere, the axis of the jet nozzle being substantially parallel to the longitudinal axis of said aircraft, and the engine thereby being adapted to produce a propulsive thrust in the direction parallel to said longitudinal axis, and a large number of gas-turbine jet-propulsion lift engines mounted adjacent the lateral axis of said aircraft wholly within the confines of the aerodynamically faired structure of the aircraft and each lift engine being of a low specific weight and dimensionally scaled to be capable of being accommodated within the aerodynamically faired structure of the aircraft, each of said lift engines comprising an air intake, a compressor, combustion equipment connected to receive air compressed in its compressor, a turbine connected to receive gases heated in said combustion equipment and connected to drive the compressor, and a propelling nozzle connected to receive exhaust gases from the turbine, and each of said lift engines being operative to produce a propulsive jet in the direction of the axis of its respective propelling nozzle, and said lift engines each being mounted in the aircraft to be adjustable between a first position in which the axis of its propelling nozzle lies substantially in a vertical plane extending parallel to said longitudinal axis, and in which the propelling nozzle faces in a direction having a rearward component, thereby to produce thrust in a direction having a rearward component in addition to that produced by said main gas-turbine jet-propulsion engine, and a second position in which the axis of its propelling nozzle is inclined substantially at right angles to both said longitudinal and lateral axes and downward with respect to the aircraft, thereby to facilitate ascent and descent of the aircraft.

2. An aircraft having a fixed main aerofoil surface, a pair of flaps pivoted at the trailing edge of the aerofoil structure to swing through substantially a right angle between first and second flap positions, one on each side of the longitudinal axis of the aircraft, and comprising a main gas-turbine jet-propulsion engine mounted in said aircraft and having a propelling nozzle through which the jet gases exhaust to atmosphere, the axis of the jet nozzle being substantially parallel to the longitudinal axis of said aircraft, and the engine thereby being adapted to produce a propulsive thrust in the direction parallel to said longitudinal axis, and a plurality of lift gas-turbine jet-propulsion engines mounted adjacent the lateral axis of said aircraft, each of said lift engines comprising an air intake, a compressor, combustion equipment connected to receive air compressed in its compressor, a turbine connected to receive gases heated in said combustion equipment and connected to drive the compressor, and a propelling nozzle connected to receive exhaust gases from the turbine, and each of said lift engines being operative to produce a propulsive jet in the direction of the axis of its respective propelling nozzle, one of said flaps having a first series of said lift engines mounted therein side by side and the other of said flaps having a second series of said lift engines mounted therein side by side, whereby said series of lift engines are mounted in the aircraft to be adjustable through substantially a right angle with the flaps between said first and second flap positions, each of said lift engines having in said first flap position the axis of its propelling nozzle parallel to the longitudinal axis of the aircraft and rearwardly-facing, thereby to produce thrust in a direction parallel to the longitudinal axis of the aircraft in addition to that produced by said main gas-turbine jet-propulsion engine, and each of said lift engines having in said second flap position the axis of its propelling nozzle inclined substantially at right angles to both said longitudinal and lateral axes and downward with respect to the aircraft, thereby to facilitate ascent and descent of the aircraft, said air intakes of the lift engines opening at the leading edges of the flaps, and duct structure arranged within said fixed aerofoil structure, said duct structure having inlet means adjacent the leading edge of said fixed aerofoil structure and having outlet means adapted to register with the air intakes of the lift engines when the latter are in said first position to convey air from adjacent the leading edge of said fixed aerofoil structure and to deliver the air to said air intakes of the lift engines.

3. An aircraft as claimed in claim 2 wherein said duct structure comprises an individual duct for each lift engine to form a forward continuation of the air intake of said lift engine in said first position of adjustment of said lift engines.

4. An aircraft having an aerodynamically faired structure and comprising a main by-pass gas-turbine jet-propulsion engine mounted in said aircraft and having a propelling nozzle through which the jet gases exhaust to atmosphere, the axis of the jet nozzle being substantially parallel to the longitudinal axis of said aircraft, and the engine thereby being adapted to produce a propulsive thrust in the direction parallel to said longitudinal axis, and a large number of simple gas-turbine jet-propulsion lift engines mounted adjacent the lateral axis of said aircraft wholly with the confines of the aerodynamically faired structure of the air-craft and each lift engine being of a low specific weight and dimensionally scaled to be capable of being accommodated within the aerodynamically faired structure of the aircraft, each of said lift engines comprising an air intake, a compressor, combustion equipment connected to receive air compressed in its compressor, a turbine connected to receive gases heated in said combustion equipment and connected to drive the compressor, and a propelling nozzle connected to receive exhaust gases from the turbine, and each of said lift engines being operative to produce a propulsive jet in the direction of the axis of its respective propelling nozzle, and said lift engines each being mounted in the aircraft to be adjustable between a first position in which the axis of its propelling nozzle lies substantially in a vertical plane parallel to said longitudinal axis, and in which its propelling nozzle faces in a direction having a rearward component, thereby to produce thrust in a direction having a rearward component in addition to that produced by said main gas-turbine jet-propulsion engine, and a second position in which the axis of its propelling nozzle is inclined substantially at right angles to both said longitudinal and lateral axes and downward with respect to the aircraft, thereby to facilitate ascent and descent of the aircraft.

5. An aircraft having a fuselage structure, an aerodynamically faired structure and comprising a main by-pass gas-turbine jet-propulsion engine mounted in said fuselage structure and having a propelling nozzle through which the jet gases exhaust to atmosphere arranged in the tail of the fuselage structure, the axis of the jet nozzle normally being substantially parallel to the longitudinal axis of said aircraft, and the engine thereby being adapted to produce a propulsive thrust in the direction parallel to said longitudinal axis, and a large number of simple gas-turbine jet-propulsion lift engines mounted adjacent the lateral axis of said aircraft wholly within the confines of the aerodynamically faired structure of the aircraft and each lift engine being of a low specific weight and dimensionally scaled to be capable of being accommodated within the aerodynamically faired structure of the aircraft, each of said lift engines comprising an air intake, a compressor, combustion equipment connected to receive air compressed in its compressor, a turbine connected to receive gases heated in said combustion equipment and connected to drive the compressor, and a propelling nozzle connected to receive exhaust gases from the turbine, and each of said lift engines being operative to produce a propulsive jet in the direction of the axis of its respective propelling nozzle, and said lift engines each being mounted in the aircraft to be adjustable between a first position in which the axis of its propelling nozzle lies substantially in a vertical plane parallel to said longitudinal axis, and in which its propelling nozzle faces in a direction having a rearward component, thereby to produce thrust in a direction having a rearward component in addition to that produced by said main gas-turbine jet-propulsion engine, and a second position in which the axis of its propelling nozzle is inclined substantially at right angles to both said longitudinal and lateral axes and downward with respect to the aircraft, thereby to facilitate ascent and descent of the aircraft.

6. An aircraft comprising an aircraft wing structure; a wing flap; a hinge structure adapted to connect said wing flap to said wing structure to be adjustable rotatively about a hinge axis which extends substantially parallel to the lateral axis of the aircraft; a plurality of slave engines mounted in said wing flap to be spaced spanwise of the wing structure with their axes parallel to one another and transverse to the hinge axis of the wing flap, each of said slave engines comprising a compressor, combustion equipment having a plurality of fuel injectors and a turbine arranged in flow series; said wing flap being formed adjacent its leading edge with a plurality of intake openings, each intake opening communicating with a compressor of a corresponding one of said slave engines, and said wing flap being formed adjacent its trailing edge with a plurality of outlet openings, each said outlet opening affording a propelling nozzle to receive exhaust gases from the turbine of a corresponding one of said slave engines to permit the exhaust gases to pass to atmosphere as a propulsive jet; actuating means for rotatively adjusting said flap about said hinge axis between a position in which the wing is of uninterrupted profile and the axes of the slave engines extend substantially parallel to the longitudinal axis of the aircraft and a position in which an increased aerodynamic drag arises from the flaps and the axes of the slave engines are substantially at right angles to the longitudinal axis and are downwardly directed; a master gas-turbine engine comprising a compressor, combustion equipment having a plurality of fuel injectors and a turbine arranged in flow series; fuel storage tank means; a first fuel pump adapted to be driven by said master engine and having a suction conduit leading thereto from said fuel storage tank means and a first delivery conduit leading therefrom to the fuel injectors of said slave engines; control means for said slave engines including a throttle valve in said first delivery conduit; a second fuel pump adapted to be driven by said master engine and having a second suction conduit leading thereto from said fuel storage tank means and a second delivery conduit leading therefrom to the fuel injectors of said master engine; and control means for said master engine independent of the control means for said slave engines and including a throttle valve in said second delivery conduit.

7. An aircraft comprising an aircraft wing structure; a wing flap; a hinge tube whereon the flap is supported at its leading edge to be angularly adjustable about the axis of the hinge tube, said hinge tube being rotatively mounted on said aircraft wing structure; a plurality of slave engines mounted in said wing flap to be spaced spanwise of the wing structure with their axes parallel to one another and transverse to the hinge axis of the wing flap, each of said slave engines comprising a compressor, combustion equipment having a plurality of fuel injectors and a turbine arranged in flow series; said wing flap being formed adjacent its leading edge with means defining an air intake opening for each of said slave engines and said wing flap being formed adjacent its trailing edge with means defining an exhaust gas outlet opening affording a propelling nozzle for each of said slave engines thereby to permit exhaust gases to pass to atmosphere as a propulsion jet; a master gas turbine engine comprising a compressor, combustion equipment having a plurality of fuel injectors and a turbine arranged in flow series; fuel storage tank means; a first fuel pump adapted to be driven by said master engine and having a suction conduit leading thereto from said fuel storage tank means and a first delivery conduit leading therefrom to the fuel injectors of said slave engines, said first delivery conduit comprising a first portion connected to said first fuel pump, a second portion accommodated in the hinge tube and a flexible connection between said first and second portions, a fuel manifold for the combustion equipment of one of the slave engines mounted in said wing flap, and a connection from said second portion to the fuel manifold; control means for said slave engines including a throttle valve in said first delivery conduit; a second fuel pump adapted to be driven by said master engine and having a second suction conduit leading thereto from said fuel storage tank means and to second delivery conduit leading therefrom to the fuel injectors of said master engines; and control means for said master engine independent of the control means for said slave engines and including a throttle valve in said second delivery conduit.

8. An aircraft as claimed in claim 6 and comprising also an air conduit connected at one end to the compressor of said master gas turbine engine and connected at its other end to said hinge tube by a flexible connection, whereby said hinge tube receives air compressed by said compressor, and pipe means connected to said hinge tube and to one at least of said slave engines so adapted and arranged that the air is directed on to the turbine rotor blading of said slave engine for the purpose of starting the slave engine.

9. An aircraft as claimed in claim 8, having said pipe means connected to deliver air from said hinged tube to the inboard slave engine, and comprising a connection to deliver starting air to each other of the slave engines from the slave engine next inboard to it.

10. An aircraft comprising an aerodynamically faired structure, a main gas-turbine jet-propulsion engine mounted in said aircraft and having a propelling nozzle through which the jet gases exhaust to atmosphere, the axis of the jet nozzle being normally substantially parallel to the longitudinal axis of said aircraft and the engine thereby being adapted to produce a propulsive thrust in the direction parallel to said longitudinal axis, said main engine being so dimensioned as to develop a thrust suitable for propelling the aircraft at a cruising speed, and a multiplicity of gas-turbine jet-propulsion lift engines, there being at least eight such engines, mounted adjacent the lateral axis of said aircraft, each of said lift engines comprising an air intake, a compressor, combustion equipment connected to receive air compressed in its compressor, a turbine connected to receive gases heated in said combustion equipment and connected to drive the compressor and a propelling nozzle connected to receive exhaust gases from the turbine, and each of said lift engines being operative to produce a propulsive jet in the direction of the axis of its respective propelling nozzle and each of said lift engines being adjustably mounted in the aircraft so that in one position at least of its adjustment its propelling nozzle is directed substantially downwards to provide a lifting force on the aircraft thereby to facilitate ascent and descent of the aircraft, said lift engines being completely housed within the confines of the aerodynamically faired structure of the aircraft and each lift engine being of a low specific weight and dimensionally scaled to be capable of being accommodated within the aerodynamically faired structure of the aircraft.

11. An aircraft having propulsion means to produce forward flight, aerodynamically faired structure including aerofoil surfaces to generate aerodynamically lift forces by such flight, and a large number of gas-turbine jet-reaction lift engines adjustably mounted wholly within said aerodynamically faired structure of the aircraft so that the thrust lines of the engines may be directed to provide a lifting force on the aircraft independently of the lift forces generated by forward flight or to produce a horizontal component of thrust, said lift engines being separate from said propulsion means and each lift engine being of a low specific weight and dimensionally scaled to be capable of being accommodated within the aerodynamically faired structure of the aircraft.

References Cited in the file of this patent

UNITED STATES PATENTS

| | | |
|---|---|---|
| 1,443,567 | Dornier | Jan. 30, 1923 |
| 1,891,166 | Leupold | Dec. 13, 1932 |
| 1,921,043 | Roth | Aug. 8, 1933 |
| 2,404,954 | Godsey | July 30, 1946 |
| 2,420,323 | Meyer | May 13, 1947 |
| 2,453,721 | Mercier | Nov. 16, 1948 |
| 2,502,045 | Johnson | Mar. 28, 1950 |
| 2,537,487 | Stone | Jan. 9, 1951 |
| 2,568,021 | Northrop | Sept. 18, 1951 |
| 2,588,532 | Johnson | Mar. 11, 1952 |
| 2,589,732 | Riviere | Mar. 18, 1952 |

FOREIGN PATENTS

| | | |
|---|---|---|
| 657,557 | France | Jan. 16, 1929 |
| 903,462 | France | Oct. 5, 1945 |
| 568,667 | Great Britain | Apr. 16, 1945 |
| 610,143 | Great Britain | Oct. 12, 1948 |